United States Patent [19]

Karlsson

[11] Patent Number: 4,565,470

[45] Date of Patent: Jan. 21, 1986

[54] APPARATUS FOR HAND DRILLING

[75] Inventor: Karl A. Karlsson, Järna, Sweden

[73] Assignee: William E. Mouzavires, Oakton, Va.; a part interest

[21] Appl. No.: 397,537

[22] Filed: Jul. 12, 1982

[51] Int. Cl.[4] .............. B23B 45/14

[52] U.S. Cl. .............. 408/72 R; 408/100; 408/712

[58] Field of Search .............. 408/72, 103, 111-114, 408/712, 110, 87, 88, 90, 91, 100; 409/182, 181

[56] References Cited

U.S. PATENT DOCUMENTS

| | | | |
|---|---|---|---|
| 97,280 | 11/1869 | Dodge | 408/88 |
| 2,463,691 | 3/1949 | Habenicht | 408/712 X |
| 2,468,358 | 4/1949 | Clark | 408/712 |
| 2,888,965 | 6/1959 | Phillips | 408/712 X |
| 2,997,900 | 8/1961 | Pugsley | 408/712 X |
| 3,276,326 | 10/1966 | Gibbons et al. | 408/72 X |
| 3,293,952 | 12/1966 | Fairbanks | 408/87 |
| 3,362,447 | 1/1968 | Elder | 408/112 X |
| 3,838,935 | 10/1974 | Boyajian | 408/712 X |
| 3,853,240 | 12/1974 | Abell | 408/110 X |
| 3,874,810 | 4/1975 | Russell | 408/110 X |
| 4,082,474 | 4/1978 | Stiger | 408/110 |
| 4,314,782 | 2/1982 | Beekenkamp | 408/88 X |
| 4,375,341 | 3/1983 | Schulze | 408/111 X |
| 4,391,558 | 7/1983 | Perry | 408/110 |

FOREIGN PATENT DOCUMENTS

| | | | |
|---|---|---|---|
| WO80/00949 | 2/1981 | PCT Int'l Appl. | 408/110 |

*Primary Examiner*—William R. Briggs

*Attorney, Agent, or Firm*—William E. Mouzavires

[57] ABSTRACT

Method and apparatus for hand drilling wherein the reaction torque generated in the hand drill from the workpiece is transferred to a support for the drill and then back into the workpiece to not only divert stress from the operator's body but also to hold the workpiece in fixed position. In one preferred embodiment, the drill support includes a holder, means mounting the body of the drill in the holder, and an elongated load transfer number on which the holder is mounted for vertical movement therealong. In use, the lower end of the load transfer member is located adjacent the side of the workpiece so that the equal but oppositely directed torques generated in the workpiece and the drill respectively will hold the workpiece fixed against the side of the load transfer member while the torque (reaction) generated in the drill is transferred away from the operator's body to the load transfer member and then into the workpiece.

21 Claims, 7 Drawing Figures

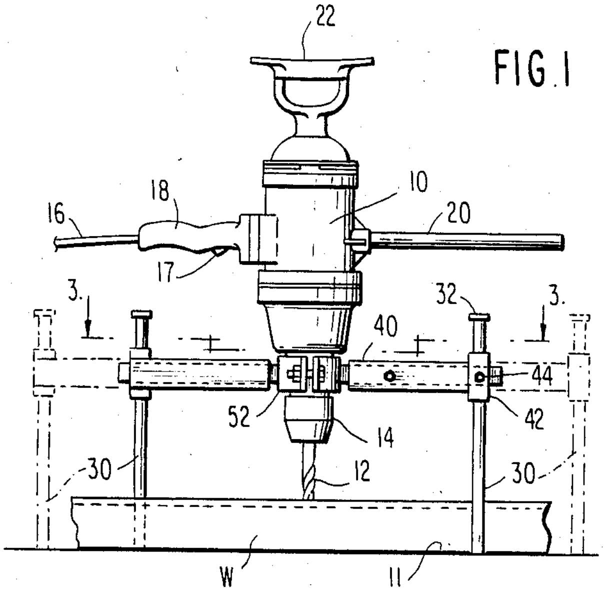
FIG.1
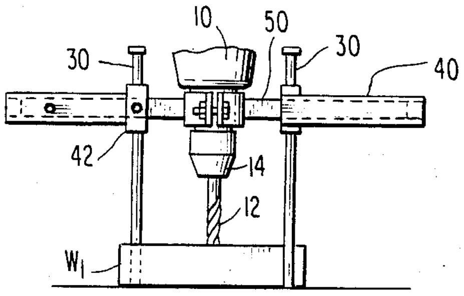
FIG.2
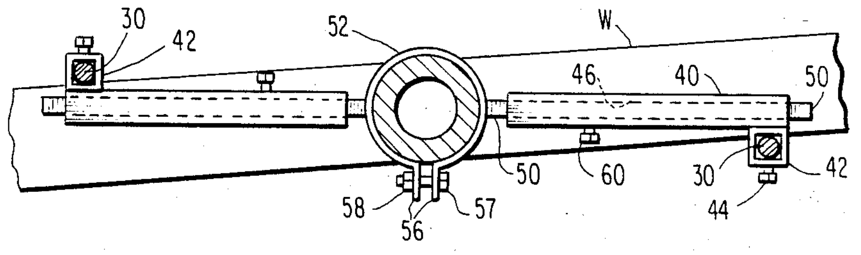
FIG.3
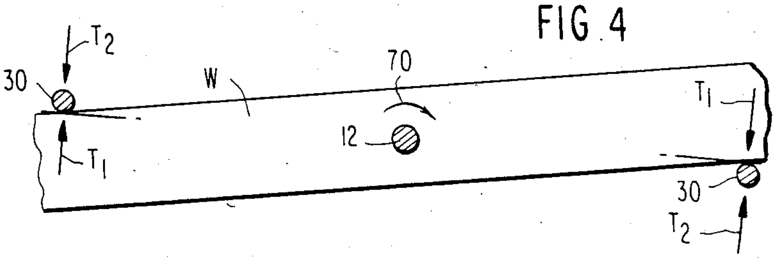
FIG.4
FIG.5
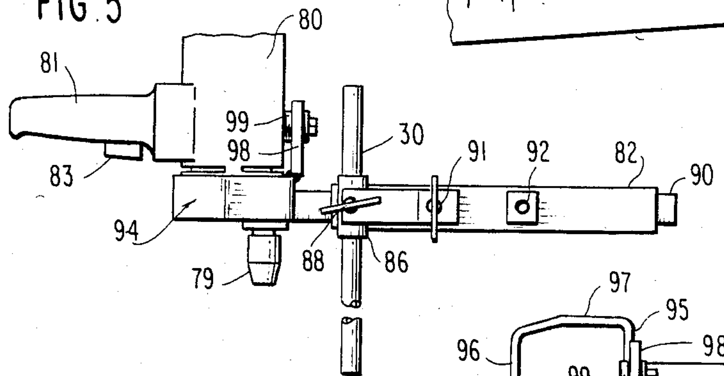
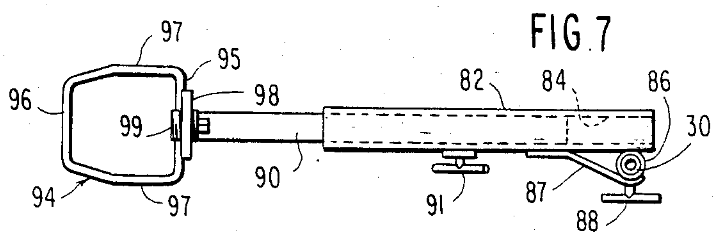
FIG.7
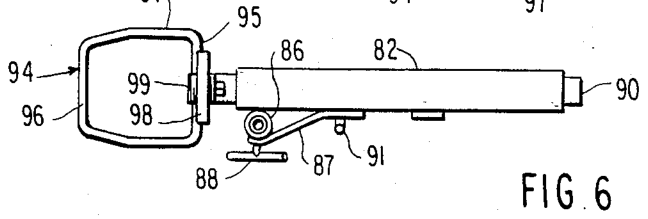
FIG.6

APPARATUS FOR HAND DRILLING

BACKGROUND OF INVENTION

Portable hand-drilling operations in the field, for example, at a construction site, have been known to suffer certain drawbacks stemming from difficulty in controlling the drill, particularly heavy drills, and difficulty in holding the workpieces. These problems not only can effect accuracy, quality and rate of production but they also seriously risk the safety of the drill operator.

During portable, hand-drilling operations, a reaction torque is generated in the drill and it is thus necessary for the drill operator to resist this torque with his body in order to hold the drill steady and to prevent rotation of the workpiece. This problem becomes most acute with heavy or large hand drills because the reaction torque can be great enough to strain the operator's hands, arms, shoulders or back. Moreover, if the drill cannot be steadied by the operator, the workpiece can rotate out of control causing a safety hazard while frustrating the drilling operation.

In order to combat the aforementioned problem, it is often necessary to drill holes at the same location in successively larger sizes (until the desired size is reached) in order to reduce the generated reaction torques. This, of course, seriously slows the rate of production and increases costs.

Other attempts to overcome the problem utilize magnetic devices for holding the drill in the proper position. However, such devices are heavy, cumbersome and costly and therefore not readily available at job sites.

To avoid the problem caused by a rotating workpiece, vises have been used. However, the problem of torque stress exerted on the operator's body still persists which can cause serious injury. Moreover, the use of vises seriously slows operations because for each drilling operation, the vise must be loosened, relocated and reset.

OBJECTS OF INVENTION

It is a primary object of the present invention to provide method and apparatus for conducting hand-drilling operations with ease, accuracy and safety and which overcome the aforementioned problems. Included herein are such method and apparatus which divert stress from the drill away from the operator's body while holding the workpiece in fixed position without a vise for safe and efficient drilling.

Another object of the present invention is to provide novel apparatus for holding a hand drill during a drilling operation to remove stress from the drill operator.

A further object of the present invention is to provide novel apparatus for preventing rotation of a workpiece being hand-drilled.

Another object of the present invention is to provide novel apparatus for holding a hand drill while preventing movement of the workpiece being drilled during a drilling operation.

A still further object of the present invention is to provide novel method and apparatus of the type described which may be applied to conventional hand drills or newly designed hand drills and which are easy and safe to operate.

A still further object of the present invention is to provide such an apparatus as described above and which is also portable and easily assembled or disassembled.

Yet a further object of the present invention is to provide such apparatus that may be manufactured either as a portable attachment for conventional or new hand drills of various designs or as part of the hand drill itself. Included herein is the provision of such apparatus that possesses relatively few parts that may be economically mass produced for retail at relatively low cost and yet will be reliable over long periods of repeated use without breakdown to improve hand drilling performance and safety.

SUMMARY OF INVENTION

In accordance with the present invention, a hand drill is held in a holder which is mounted for movement along a vertical load transfer member which may be termed a "jack". Where the workpieces to be drilled are of a discrete size, the jack is located to extend alongside of the workpiece so that the torque generated in the workpiece will tend to cause the workpiece to rotate against the jack while the equal but oppositely directed reaction torque will be transferred from the drill through the jack and into the workpiece, thus tending to rotate the jack against the workpiece. Since these torques are equal in magnitude but oppositely directed, the result will be that the workpiece is held stationary against the jack and vice versa. In addition, The reaction torque is diverted from the operator's body and transferred back to the workpiece.

If the object to be drilled is of very large size or indiscriminate in dimension, the jack may be anchored against another object or against the foot of the operator to divert stress from the upper part of the operator's body.

In cases where the jack is not grounded on a surface during drilling, the holder is tightly fastened to the jack so that they move together as a unit with advancement of the drill.

The holder is made as a portable attachment to the hand drill or as a part of the body of the hand drill. For large hand drills, two holders and jacks may be employed respectively on diametrically opposite sides of the hand drill.

Although certain preferred embodiments of the apparatus of the invention are shown and described below for purposes of illustration, the concepts of the present invention can be utilized to otber specific embodiments which will become readily apparent from the present specification.

DRAWINGS

Other objects and advantages of the present invention will become readily apparent from the following more detailed description taken in conjunction with the attached drawings in which:

FIG. 1 is a side, elevational view of apparatus constituting one preferred embodiment of the present invention as seen with a workpiece, shown in fragment, and as seen partly in dotted lines illustrating another position into which the apparatus may be adjusted;

FIG. 2 is a view generally similar to FIG. 1 except with the positions of certain parts of the apparatus interchanged to accommodate a workpiece of smaller length and with upper portions of the hand drill removed;

FIG. 3 is a cross-sectional, plan view taken generally along lines 3—3 of FIG. 1;

FIG. 4 is a view generally similar to FIG. 3 with parts removed, illustrating oppositely directed torque forces encountered during a drilling operation;

FIG. 5 is a side, elevational view of apparatus constituting another preferred embodiment of the invention as seen with another, smaller type of hand drill than that illustrated in FIG. 1;

FIG. 6 is a plan view of the apparatus of FIG. 5 but excluding the hand drill; and FIG. 7 is a view similar to FIG. 6 but with a portion of the apparatus reversed in position for accommodating a workpiece (not shown) of greater length.

DETAILED DESCRIPTION

Referring now to the drawings in detail there is shown in FIGS. 1 through 4, for illustrative purposes only, a first preferred embodiment of the invention that may be applied to a portable hand drill generally designated 10 in FIG. 1. Hand drill 10 itself may be any conventional hand drill for drilling holes in a workpiece W as shown in FIG. 1 as resting on a surface 11. Hand drill 10 typically includes a chuck 14 for holding a rotary cutting tool or bit 12. The chuck is, of course, rotatable by a motor in the drill housing and power driven through a power cord 16 and controlled through a trigger 17 lying below a handle 18. Additional handles 20 and 22 are also incorporated as is conventional. In conventional drilling operations, the operator grasps handles 18 and 20. However, due to the reaction torque generated in the drill, the operator must often exert great effort to prevent the drill from rotating which also causes rotation of the workpiece. This can cause serious injury to the operator and at the same time, impede or frustrate the efficiency of the drilling operation.

In accordance with the present invention, a method and apparatus are provided to overcome the aforementioned problems in a manner that is easily applicable to conventional hand drills. The apparatus basically includes at least one load transfer member generally designated 30, and means for mounting or connecting the hard drill 10 to the load transfer member 30 as will be described in greater detail. In the preferred embodiment of FIG. 1, there are two load transfer members 30 (which may also be termed "jacks") each in the form of a sturdy, rigid pipe or rod of steel or other suitable material located laterally of the drill 10 at diametrically opposed locations. The means for mounting the drill 10 to each jack 30 in the specific embodiment shown in FIG. 1 includes a holder generally designated 40 and an arm 50 fixed to the hand drill and received by the holder 40. Although it is possible to form the arm 50 as an inseparable part of the drill 10 itself, it is preferred to form the arm 50 as part of a yoke 52 or other similar means that may be releasably secured to the body of drill 10 as shown in FIG. 1.

In the preferred embodiment, holder 40 is formed by a tubular steel member shown as having a rectangular cross section and, of course, having a through passage 46 extending to opposite, open ends of the holder 40. Arm 50 is formed by a steel bar of rectangular cross section corresponding to that of the internal passage 46 of holder 40 to be slidable therein into any desired position. Arm 50 may be formed as an integral part of yoke 52 or may be welded thereto so that it rigidly projects laterally therefrom as illustrated in the drawings. Yoke 50 may take any desired form that will enable fixation to the body of the drill 10. In the specific form shown, yoke 52 is in the nature of a C clamp or shackle which is dimensioned to encircle the pertinent portion of the body of the drill which portion is shown as cylindrical in shape and located in the region above the chuck 14. Yoke 52 terminates in apertured flanges 56, 57 secured together by a nut and bolt assembly 57, 58. It will be obvious that other yokes and yoke shapes may be employed depending on the size and shape of the associated drill body. Moreover, other types of methods and means may be employed to interconnect the drill body to the associated jacks 30.

In order to secure arm 50 to the holder 40 in any desired position therein, any suitable releasable fastening device or means may be employed. One simple method is to utilize a thumb screw or set screw such as 60 (FIG. 3) threaded through the wall of holder 40 so that its internal extremity engages against the arm 50. Of course, a wrench may be applied to the head of screw 60 to sufficiently tighten it against arm 50.

In order to mount holder 40 to the associated jack 30, the preferred embodiment includes a sleeve-like member 42 fixed such as by welding to one side of the holder as perhaps best shown in FIG. 3. Sleeve-like member 42 has a vertical through passage for slidably receiving jack 30 to permit the holder 40 to slide downwardly along the jack 30 as the drill advances during a drilling operation and in cases where the lower end of the jack is engaged or grounded against a surface such as 11. In order to control the position and movement of holder 40 along jack 30, a releasable fastening device is employed to exert a desired degree of pressure against the jack 30. Here again, a simple set screw or thumb screw 44 is utilized in the wall of the sleeve-like member 44 to be engageable with jack 30 to control the movement of holder 40 along jack 30 during a drilling operation where the end of the drill is grounded against a support surface. However, in some uses, the extremity of jack 30 adjacent the workpiece W will not be grounded on a support surface such as 11 in which case the screw 44 may be tightly fastened against the jack 30 so that the holder 40 and jack 30 will move together as a unit with the drill 10 as the latter advances during drilling. To assist in retaining the jack 30 in the sleeve member 42 against accidental removal, the jack 30 is provided with a cap 32 larger in diameter or cross dimension than that of the internal passage of sleeve member 42.

Both of the jacks 30 and holders 40 utilized in the embodiment of FIG. 1 are identical. Moreover, their positions may be interchanged from that of FIG. 1 to that of FIG. 2 in order to reduce the distance between the jacks 30 to accommodate workpieces of smaller length such as W1 shown in FIG. 2. The open opposite ends of the holders 40 allow the arms 50 to be inserted through either end of the holder as may be required.

In use of the apparatus, and with reference to FIG. 3, the holders 40 with their jacks 30, are positioned on the arms 50 with jacks 30 located on opposite sides of arms 50. Holders 40 are then slid along arms 50 into the desired position depending on the length of the workpiece and with jacks 30 equidistant from the center of the drill or bit 12. The dotted lines in FIG. 1 illustrate another position of jacks 30 that may be used for a larger workpiece. Once the holders are adjusted into proper position, screws 60 are then fastened against arms 50 to secure the latter in holders 40. The drill may then be positioned to place the jacks 30 on opposite sides of the workpiece W as shown in FIG. 3. The operator may then grasp handles 18 and 20 or 18 and 22 and commence drilling.

Referring now to FIG. 4, arrow 70 illustrates the direction of rotation of drill bit 12. A torque will be generated in the workpiece W in a direction indicated by arrows $T_1$. A reaction torque will be generated in drill 10 but this torque will be transferred from drill 10 through jacks 30 and into the workpiece. The reaction torque is indicated by the arrows $T_2$ in FIG. 4. As the torques $T_1$ and $T_2$ are equal and oppositely directed, the workpiece will be held stationary against the sides of jacks 30 and vice versa. Moreover, the torque generated in drill 10 will be diverted away from the operator and back into the workpiece. The result is a smooth and efficient drilling operation with no harmful torque stress received by the operator. Hand drill 80 itself may be conventional and includes a handle 81 and a control button or trigger 83 for controlling the motor which is housed within the drill 80.

Referring now to FIGS. 5 to 7, there is illustrated another preferred embodiment of apparatus of the invention which may be applied to a conventional hand drill 80 that is of a smaller size than hand drill 10 of FIGS. 1 to 4. The apparatus of the present invention in the embodiment of FIGS. 5 to 7 includes a holder 82 similar to holder 40 described above and including a through passage 84 and a sleeve 86 for receiving a jack 30. In the specific embodiment, sleeve 80 is fixed to the side wall of holder 82 by a bracket 87 which may be welded to holder 82. A thumb screw 88 is provided through the bracket 87 and sleeve 86 to be engageable with jack 30 to fix or control its position.

Slidably received in holder 82 is an arm 90 which is held in any desired position by thumb screw 91. In the specific embodiment, holder 82 is provided with another threaded opening at 92 (see FIG. 5) for receiving thumb screw 91.

Arm 90 is fixed to a yoke 94 which in the specific form includes a continuous polygonal enclosure made from any suitable sturdy material and shaped to correspond to the external shape of the drill 80 above the chuck 79. Specifically, yoke 94 includes a front wall 95, a rear wall 96 generally parallel to the front wall 95 and opposite side walls 97 defining a cavity for receiving the drill 80. Arm 90 projects laterally from front wall 95 at the center thereof where it may be integrally joined or welded.

In order to secure the drill 80 within yoke 94, the front wall 95 has a flange 98 projecting upwardly therefrom to extend along the casing of the drill 80 as shown in FIG. 5. A bolt 99 is received through a threaded aperture in flange 98 for engagement against the housing of the drill 80 as shown in FIG. 5. Advancement of bolt 99 will secure the drill within the yoke 94. Even though only a single jack 30 is used in the embodiment of FIGS. 5 to 7, the principle of operation is the same as described above. That is, the torque generated in the drill will be transferred to the jack 30 and back to the workpiece which is held in place against the side of the jack 30.

In drilling large workpieces where the side of the jack 30 cannot be placed against the workpiece, another support (not shown) may be used to anchor the jack to transmit reaction torque to the support. In some cases, the operator may place the jack 30 against his boot to steady the drill and divert stress away from his arms. In cases wherein the end of the jack 30 is not grounded against a support but still engages the side of the workpiece, the jacks are secured within the sleeves 42 so that they will advance with the drill as the drilling proceeds.

In any case, it will be seen that the present invention may be used in drilling large or small workpieces without subjecting the operator to harmful torque stress.

Although certain preferred embodiments have been described in detail above for purposes of disclosing the invention, the scope of the invention is not limited to the specific embodiments described but rather is defined by the attached claims in accordance with the patent laws.

What is claimed is:

1. Portable hand-drilling apparatus comprising in combination, a portable hand drill having a body and a chuck mounted to the body for rotation, at least one handle projecting from the body above the chuck for manipulating the drill, a yoke positioned between the handle and chuck and releasably fixed to the body against rotation and having an arm projecting laterally therefrom, an elongated rigid load transfer member having a free end adapted to be freely engaged against a side of a workpiece to be drilled, means mounting the arm to the load transfer member against rotation relative thereto while permitting the arm together with the yoke and drill to move along the load transfer member such that during a drilling operation the free end of the load transfer member is placed against the side of the workpiece to transfer torque through the load transfer member and laterally onto the workpiece to divert torque stress from the user's body while securing the hand drill to the workpiece without positively attaching the load transfer member to the workpiece, said means including a holder receiving said arm for slidable movement of said arm relative to the holder into one of a plurality of selectable positions, said holder having mounting means slidably receiving the load transfer member to allow the holder together with the arm and drill body to move along the load transfer means, and wherein there is further included means releasably fixing the arm to said holder in a selected position.

2. Apparatus defined in claim 1 wherein said means mounting the arm to the load transfer member permits the distance between the yoke and load transfer member to be varied.

3. Apparatus defined in claim 2 wherein said means mounting the arm to the load transfer member includes a holder slidably receiving the arm and means releasably fixing the arm in the holder against slidable movement relative to each other.

4. Portable hand-drilling apparatus comprising in combination, a portable hand drill including a body having a chuck and at least one handle projecting from the body above the chuck for manipulating the drill, a portable load transfer member having a free end adapted to be engaged against a side of a workpiece to be drilled to transfer torque to the workpiece during a drilling operation, and means affixable to the body of the hand drill for mounting the body to the load transfer member for movement along the load transfer member during a drilling operation while the load transfer member is engaged against the side of the workpiece to transfer torque through the load transfer member and laterally into the workpiece thereby diverting torque from the user's body while securing the hand drill relative to the workpiece without positively attaching the load transfer member to the workpiece, said means including a yoke fixed to said body between said handle and chuck, a holder, an arm slidably received on said holder, one of said arm and holder being fixed to said yoke and projecting laterally from said body, the other of said holder and arm having fixed thereto a mounting means slidably receiving the load transfer member to mount the drill body for movement along the load transfer member, said holder and arm being slidable relative to each other to position the load transfer member at a selected distance from the body, and wherein there is further included means for releasably fixing the arm and holder relative to each other in any one of a number of selected positions, and means for releasably retaining said mounting means on said load transfer member while permitting slidable movement of said arm and holder together with said drill body along said load transfer means.

5. Apparatus defined in claim 4 wherein said load transfer member is a rigid column and said mounting means includes a sleeve-like member mounted on the column.

6. Apparatus defined in claim 5 wherein said column is portable and removable from said sleeve to disassemble said apparatus.

7. Apparatus defined in claim 4 wherein said arm is fixed to and projecting laterally from said yoke.

8. Apparatus defined in claim 7 wherein said holder has a passage receiving said arm in one of several preselectable positions depending on the distance desired between the body and the load transfer member.

9. Apparatus defined in claim 8 wherein said passage in said holder extends longitudinally throughout the holder between opposite open ends of the holder, and wherein said arm is receivable in the passage through either of said open ends of the holder.

10. Apparatus defined in claim 4 wherein said load transfer member includes a rigid column extending generally at right angles to said arm and holder.

11. Apparatus defined in claim 8 wherein said arm is removable from said holder and said holder is removable from said load transfer means for disassembling the apparatus.

12. Apparatus defined in claim 11 wherein there is included means for releasably securing the yoke member to said body while permitting said yoke member to be removed from said body for disassembling the apparatus.

13. Apparatus defined in claim 4 wherein there is further included means for releasably securing the yoke member to said body.

14. Apparatus defined in claim 4 wherein there is included a second load transfer member having a free end adapted to be engaged against the workpiece at a location opposite the first defined load transfer member, and means for mounting the body to said second load transfer member for movement along said second load transfer member and with said body located between said first and second load transfer members.

15. Portable hand-drilling apparatus for use with a portable hand drill having a body including a chuck and at least one handle projecting from the body above the chuck for manipulating the drill, the apparatus comprising an elongated rigid load transfer member having a free end, and means affixable to the body of a hand drill for mounting a hand drill on said load transfer member for movement along the member during a drilling operation such that the free end of the load transfer member may be placed against a side of the workpiece to be drilled during a drilling operation to transfer torque through the load transfer member and laterally into the workpiece thereby diverting torque from the user's body while securing the hand drill relative to the workpiece without positively attaching the load transfer member to the workpiece, said means including a yoke adapted to be releasably fixed to said body between said handle and said chuck, a holder, an arm slidably received on said holder, one of said arm and holder being fixed to said yoke and projecting laterally from said body, the other of said holder and arm having fixed thereto a mounting means slidably receiving the load transfer member to mount the drill body for movement along the load transfer member, said holder and arm being slidable relative to each other to position the load transfer member at a selected distance from the body, and wherein there is further included means for releasably fixing the arm and holder relative to each other in any one of a number of selected positions, and means for releasably retaining said mounting means on said load transfer member while permitting slidable movement of said arm and holder together with said drill body along said load transfer means.

16. Apparatus defined in claim 15 wherein said arm is fixed to said yoke member and said holder is slidable on said arm.

17. Apparatus defined in claim 16 wherein said holder has a longitudinally extending through passage and wherein said arm is receivable in said passage.

18. Apparatus defined in claim 16 wherein said mounting means is a sleeve-like member fixed to said holder and receivable on and movable along said load transfer member.

19. Apparatus defined in claim 18 wherein there is included a fastener means on the sleeve-like member for releasably securing said sleeve-like member to said load transfer member, and a fastener means on said holder for releasably securing said arm in said holder.

20. Apparatus defined in claim 16 wherein said load transfer member is a column.

21. Apparatus defined in claim 20 wherein said column and arm are each removable from said holder for disassembling the apparatus.

* * * * *